US012765699B2

(12) United States Patent
Rivera et al.

(10) Patent No.: US 12,765,699 B2
(45) Date of Patent: Oct. 20, 2026

(54) RETAIL DISPLAY ASSEMBLY

(71) Applicant: OnQ Solutions, Inc., Hayward, CA (US)

(72) Inventors: Carlos Rivera, Gilberts, IL (US); Richard B. Bray, Hayward, CA (US)

(73) Assignee: OnQ Solutions, Inc., Hayward, CA (US)

( * ) Notice: Subject to any disclaimer, the term of this patent is extended or adjusted under 35 U.S.C. 154(b) by 0 days.

(21) Appl. No.: 19/171,157

(22) Filed: Apr. 4, 2025

(65) Prior Publication Data

US 2026/0305844 A1 Oct. 8, 2026

(51) Int. Cl.

*A47F 7/02* (2006.01)
*A47F 3/06* (2006.01)
*A47F 7/024* (2006.01)
*E05B 65/46* (2017.01)

(52) U.S. Cl.

CPC .............. *A47F 7/024* (2013.01); *A47F 3/063* (2013.01); *E05B 65/46* (2013.01)

(58) Field of Classification Search

CPC ........... A47F 7/024; A47F 3/063; E05B 65/46
See application file for complete search history.

(56) References Cited

U.S. PATENT DOCUMENTS 5,312,000 A * 5/1994 Bass ....................... A47F 7/286 211/74
5,711,435 A * 1/1998 Morison ................... A47F 5/08 248/223.41
5,772,357 A * 6/1998 Evans ..................... E01F 9/588 256/13.1
7,287,652 B2 * 10/2007 Scholen .................... A47F 7/02 340/568.2
7,546,703 B2 6/2009 Johnske et al.
8,360,373 B2 * 1/2013 Johnson ................. H05K 7/026 340/568.1
8,506,109 B2 * 8/2013 Stukenberg ............... A47F 7/02 362/132
8,523,301 B1 * 9/2013 Britson ................... E05B 65/46 312/334.47
8,657,154 B2 * 2/2014 Obitts ..................... G07F 11/64 221/124
9,384,684 B2 * 7/2016 Theisen ................ A47F 5/0043
9,615,677 B2 * 4/2017 Trinh .................... A47F 5/0043
10,448,759 B1 10/2019 Chapuis et al.

(Continued)

*Primary Examiner* — Ko H Chan
(74) *Attorney, Agent, or Firm* — Pearl Cohen LLP

(57) ABSTRACT

A retail display assembly includes a base cabinet and a drawer. The base cabinet includes a top panel and a front opening. The drawer includes a front panel and top opening and is configured to transition between closed and open positions. The top panel of the base cabinet includes through holes to receive downwardly extending threaded rods of security brackets to selectively secure portable electronic devices to the top panel of the base cabinet. The top opening of the drawer and an underside of the top panel of the base cabinet are accessible when the drawer is in the open position, and are inaccessible when the drawer is in the closed position. The retail display assembly is usable as a topper when the base cabinet is supported by a lower cabinet, and as a cantilever shelf when the base cabinet is supported by shelf brackets attached to vertical uprights.

23 Claims, 9 Drawing Sheets

(56) References Cited

U.S. PATENT DOCUMENTS

| | | | | |
|---|---|---|---|---|
| 10,498,119 | B2 * | 12/2019 | Nehls | H02G 3/0456 |
| 10,638,083 | B1 * | 4/2020 | Monroe | G09F 15/0012 |
| 10,920,922 | B2 | 2/2021 | Chapuis et al. | |
| 11,311,119 | B2 | 4/2022 | Durham et al. | |
| 11,375,826 | B2 * | 7/2022 | Hardy | A47B 73/006 |
| 11,432,663 | B2 | 9/2022 | Chapuis et al. | |
| 11,585,125 | B2 | 2/2023 | Chapuis et al. | |
| 11,666,161 | B2 | 6/2023 | Osiecki et al. | |
| 12,071,790 | B2 | 8/2024 | Chapuis et al. | |
| 12,285,120 | B2 * | 4/2025 | Smith | A47F 3/002 |
| 2004/0188285 | A1 * | 9/2004 | Yoshikawa | B65D 85/18 206/508 |
| 2005/0161420 | A1 | 7/2005 | Hardy et al. | |
| 2009/0284112 | A1 | 11/2009 | Mehmen | |
| 2010/0012600 | A1 * | 1/2010 | Clontz | A47B 96/02 211/26 |
| 2011/0062294 | A1 * | 3/2011 | Johnson | F16M 11/00 248/161 |
| 2012/0012547 | A1 * | 1/2012 | Bergdoll | A47F 5/08 211/59.2 |
| 2012/0262039 | A1 * | 10/2012 | Daugbjerg | A61G 12/001 312/249.11 |
| 2012/0280600 | A1 | 11/2012 | Noel et al. | |
| 2013/0087081 | A1 | 4/2013 | Stukenberg et al. | |
| 2013/0229098 | A1 * | 9/2013 | Pletcher | E05B 65/46 312/333 |

* cited by examiner

RETAIL DISPLAY ASSEMBLY

FIELD OF TECHNOLOGY

Embodiments of the present technology relate to apparatuses that can be used by retailers to physically display and secure portable electronic devices and other items in retail stores.

BACKGROUND

Retailers that sell portable electronic devices often want to display samples of the portable electronic devices in their retail stores in a manner that enables customers to view and interact with the samples of the portable electronic devices, while preventing or at least mitigating against thefts of the samples of the portable electronic devices that are being displayed. Such portable electronic devices, the samples of which can also be referred to herein as display models, include, e.g., smart phones, smart watches, tablet computers, laptop computers, gaming devices and systems, and portable audio speakers, just to name a few.

For various different reasons, such as preferences or requirements of a specific retail store, a specific location within the retail store, specific types of portable electronic devices, and/or specific marketing campaigns, when a retailer displays certain portable electronic devices the retailer may want to display the portable electronic devices above a lockable cabinet that stores inventory of (and/or accessories for and/or other devices related to) the portable electronic devices that can only be accessed by an authorized employee of the retailer. Other times, retails may want to display certain portable electronic devices on a cantilever shelf below which inventory of (and/or accessories for and/or other devices related to) the portable electronic devices can be accessed by customers without the assistance of an authorized employee of the retailer.

SUMMARY

A retail display assembly, according to an embodiment of the present technology, includes a base cabinet, a drawer, and a lock mechanism. The base cabinet has a top panel, a left side panel, a right side panel, and a front opening. The drawer has a bottom panel, a left side panel, a right side panel, a front panel, and a top opening. The drawer is configured to slide out from and into the front opening of the base cabinet to thereby transition the drawer between a closed position and an open position. The lock mechanism is configured to selectively lock the drawer in the closed position. The top panel of the base cabinet includes a plurality of top panel through holes configured to receive downwardly extending threaded rods of one or more security brackets configured to selectively secure one or more portable electronic devices to the top panel of the base cabinet. The top opening of the drawer is accessible when the drawer is in the open position, such that one or more items can be placed in the drawer when the drawer is in the open position. The top opening of the drawer is inaccessible when the drawer is locked in the closed position by the lock mechanism, such that the one or more items placed in the drawer are inaccessible when the drawer is locked in the closed position by the lock mechanism. An underside of the top panel of the base cabinet is inaccessible when the drawer is locked in the closed position by the lock mechanism, such that fasteners secured to downwardly extending threaded rods of one or more security brackets are inaccessible when the drawer is locked in the closed position by the lock mechanism thereby preventing the one or more security brackets and the one or more portable electronic devices secured thereto from being removable from the retail display assembly when the drawer is locked in the closed position by the lock mechanism.

In accordance with certain embodiments, the base cabinet is devoid of a bottom panel extending between the left and right side panels of the base cabinet so that when the drawer is in the open position the underside of the top panel of the base cabinet is accessible and downwardly extending threaded rods of one or more security brackets that extend through at least some of the plurality of top panel through holes of the base cabinet are accessible from an underside of the base cabinet so that fasteners can be manually secured to or removed from the downwardly extending threaded rods.

In accordance with certain embodiments, the retail display assembly is usable as a topper when the base cabinet is supported by a lower cabinet upon which the retail display assembly rests, and as a cantilever shelf when the base cabinet is supported by shelf brackets attached to vertical uprights.

In accordance with certain embodiments, the retail display assembly further comprises first and second shelf brackets selectively attachable to the base cabinet, adjacent to the left side and right side panels of the base cabinet, to enable the base cabinet to be attached to first and second vertical uprights to enable the retail display assembly to be used as a cantilever shelf.

In accordance with certain embodiments, the base cabinet further includes a right bottom flange that extends inward from the right side panel of the base cabinet, and a left bottom flange that extends inward from the left side panel of the base cabinet, wherein each of the right bottom flange and the left bottom flange includes one or more flange through holes configured to enable threaded bolts and fasteners to secure the base cabinet to a lower cabinet upon which the retail display assembly rests when the retail display assembly is being used as a topper.

In accordance with certain embodiments, the base cabinet further comprises a rear panel extending between the left and right side panels of the base cabinet, wherein the rear panel of the base cabinet includes one or more rear panel through holes sized to allow an electrical plug and an electrical cable attached thereto to pass therethrough to enable electronics stored within the drawer to be plugged into one or more electrical sockets located outside of the of the base cabinet and the drawer.

In accordance with certain embodiments, where the drawer is devoid of a rear panel extending between the left and right side panels of the drawer, so that when the drawer is transitioned from the open position to the closed position, the drawer is not blocked by downwardly extending threaded rods of one or more security brackets that extend through at least some of the top panel through holes. Additionally, because the drawer is devoid of a rear panel, when an electrical plug and an electrical cable attached thereto pass through a rear panel through hole in the rear panel of the base cabinet, the electrical cable and the electrical plug attached thereto will not get inadvertently sandwiched between the drawer and the rear panel of the base cabinet.

In accordance with certain embodiments, the front panel of the drawer is at an acute angle relative to the bottom panel of the drawer and is at an obtuse angle relative to the top panel of the base cabinet.

In accordance with certain embodiments, the front panel of the drawer includes an upper channel and a lower channel between which a rectangular sheet can be slid therein and held in place.

In accordance with certain embodiments, the front panel of the drawer includes a plurality of front panel through holes that enables a price rail holder and/or a placard to be attached using one or more threaded bolts and respective fasteners.

In accordance with certain embodiments, the top panel of the base cabinet includes an upper channel and a lower channel between which a rectangular sheet can be slid therein and held in place.

In accordance with certain embodiments, the rear panel of the base cabinet includes a plurality of guide plates each of which extends inward from the rear panel and includes a respective guide through opening. Additionally, the lock mechanism comprises a rotatable lock body, a lock plate attached to the rotatable lock body and including left and right curved through channels, and left and right lock rods. The left lock rod is slidably attached at a proximal end thereof to the left curved through channel in the lock plate and extending through the guide through openings in a first subset of the guide plates. The right lock rod is slidably attached at a proximal end thereof to the right curved channel in the lock plate and extending through the guide through openings in a second subset of the guide plates. When the drawer is in the closed position and the lock mechanism is in a locked position the left and right lock rods are in their extended positions such that distal ends thereof extend into respective through openings in the left and right side panels of the drawer, thereby preventing the drawer from being opened. When the lock mechanism is transitioned from the locked position to an unlocked position, in response to a key being used to rotate the rotatable lock body and the lock plate attached thereto, the left and right lock rods transition to their retracted positions such that the distal ends thereof no longer extend into the respective through openings in the left and right side panels of the drawer, thereby allowing the drawer to be opened.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

As noted above, retailers that sell portable electronic devices often want to display samples of the portable electronic devices in their retail stores in a manner that enables customers to view and interact with the samples of the portable electronic devices, while preventing or at least mitigating against thefts of the samples of the portable electronic devices that are being displayed. As also noted above, such portable electronic devices can be, e.g., smart phones, smart watches, tablet computers, laptop computers, gaming devices and systems, and portable audio speakers, but are not limited there.

As also noted above, for various different reasons, when a retailer displays certain portable electronic devices the retailer may want to display the portable electronic devices above a lockable cabinet that stores inventory of (and/or accessories for and/or other devices related to) the portable electronic devices that can only be accessed by an authorized employee of the retailer. Other times, retails may want to display certain portable electronic devices on a cantilever shelf below which inventory of (and/or accessories for and/or other devices related to) the portable electronic devices can be accessed by customers without the assistance of an authorized employee of the retailer.

Conventionally, a retailer would need to purchase and use different type of retail displays to satisfy the above described two different types of needs. However, with certain embodiments of the present technology described herein, a retailer could instead purchase and use one type of retail display assembly to satisfy the above described two different types of needs. More specifically, in accordance with certain embodiments of the present technology described below with reference to FIGS. 1A-6B, a retail display assembly 100 is usable both as a topper that rests upon a lower cabinet, and as a cantilever shelf supported by shelf brackets attached to vertical uprights. Accordingly, if the retailer purchases multiple units of the retail display assembly, one or more of the units can be used as a topper, while one or more other ones of the units can be used as a cantilever shelf. Additionally, depending upon the specific needs of the retailer, one of the units of the retail display assembly that had been used as a topper, can thereafter be used as a cantilever shelf, and/or vice versa.

Figure 1A:
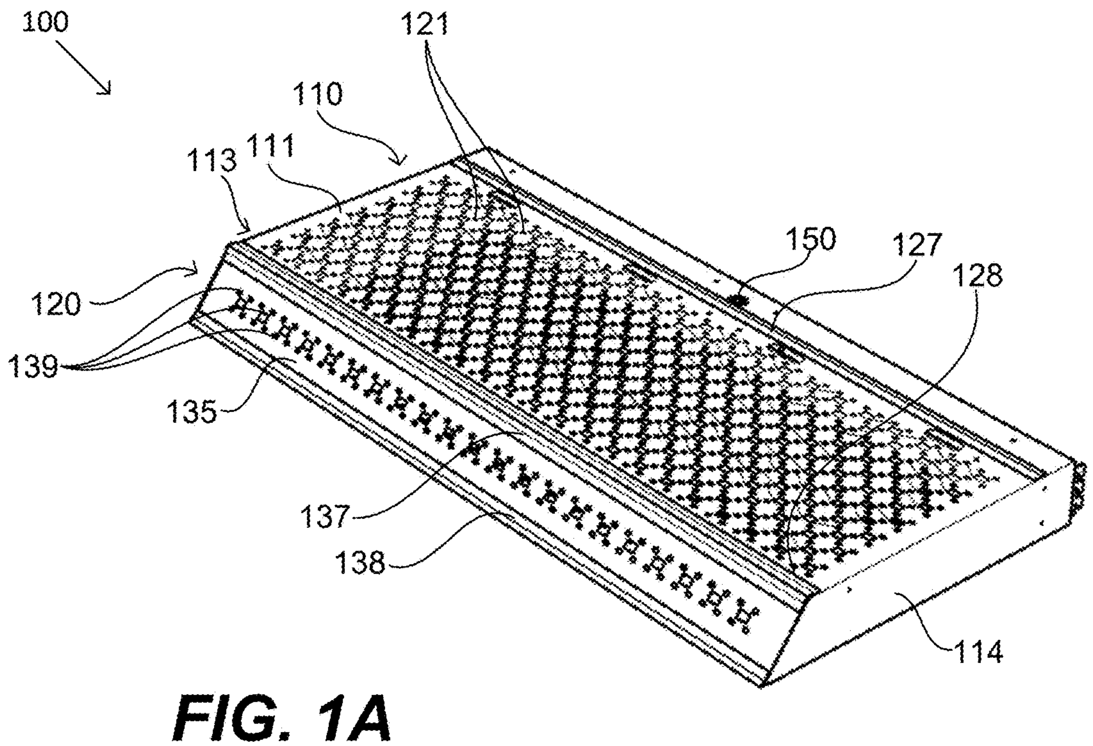
FIG. 1A illustrates a retail display assembly including a base cabinet and a drawer, in accordance with an embodiment of the present technology, with the drawer is in its closed position.
Figure 1B:
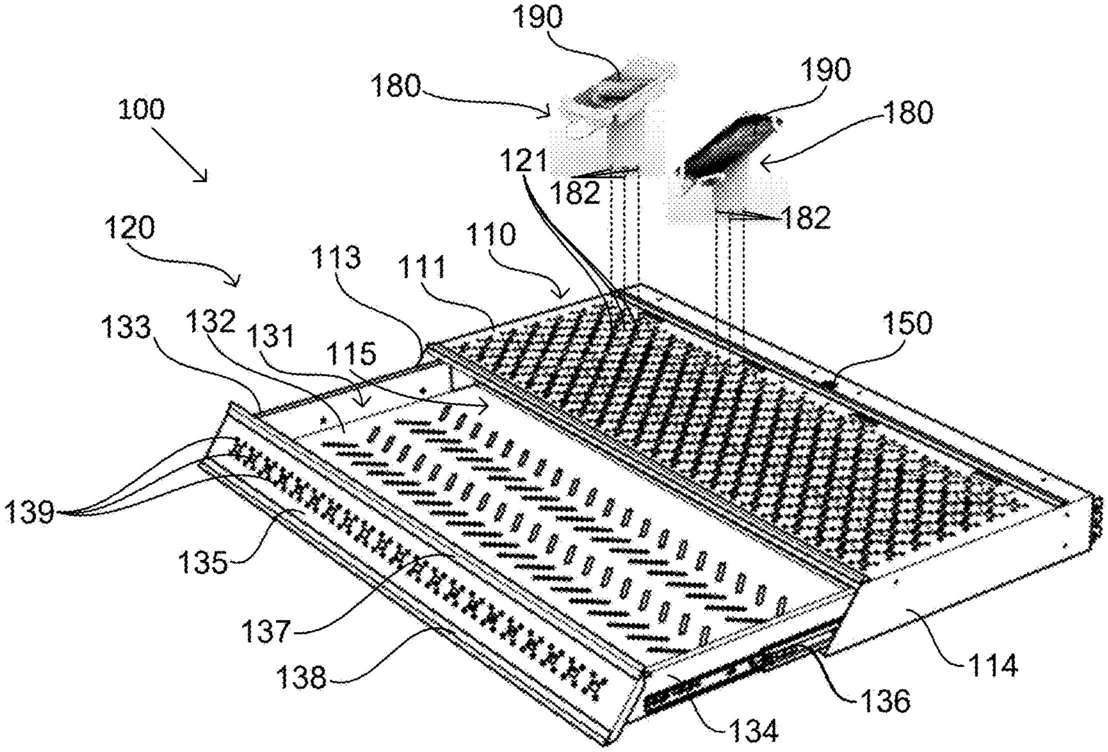
FIG. 1B illustrates the retail display assembly, introduced in FIG. 1A, with the drawer in its open position.

Referring initially to FIGS. 1A and 1B, the retail display assembly 100 includes a base cabinet 110 and a drawer 120. The base cabinet 110 includes a top panel 111, a left side panel 113, a right side panel 114, and a front opening 115. The drawer 120 includes a bottom panel 132, a left side panel 133, a right side panel 134, a front panel 135, and a top opening 131. An outer portion of the right side panel 134 of the drawer 120 is slidably connected to an inner portion of the right side panel 114 of the base cabinet 110 by a right drawer slide 136, as shown in FIG. 1B. Similarly, an outer portion of the left side panel 133 of the drawer 120 is slidably connected to an inner portion of the left side panel 113 of the base cabinet 110 by a left drawer slide, which cannot be seen in FIG. 1B, but is a mirror image of the right drawer slide 136. The drawer 120 is configured slide out from and into the front opening 115 of the base cabinet 110 to thereby transition the drawer 120 between a closed position shown in FIG. 1A and an open position shown in FIG. 1B, and vice versa. As can be appreciated from FIG. 1A, when the drawer is in the closed position, the front panel 135 of the drawer 120 covers the front opening of the base cabinet 110, and the top panel 111 of the base cabinet 110 covers the top opening 131 of the drawer 120.

Figure 3A:
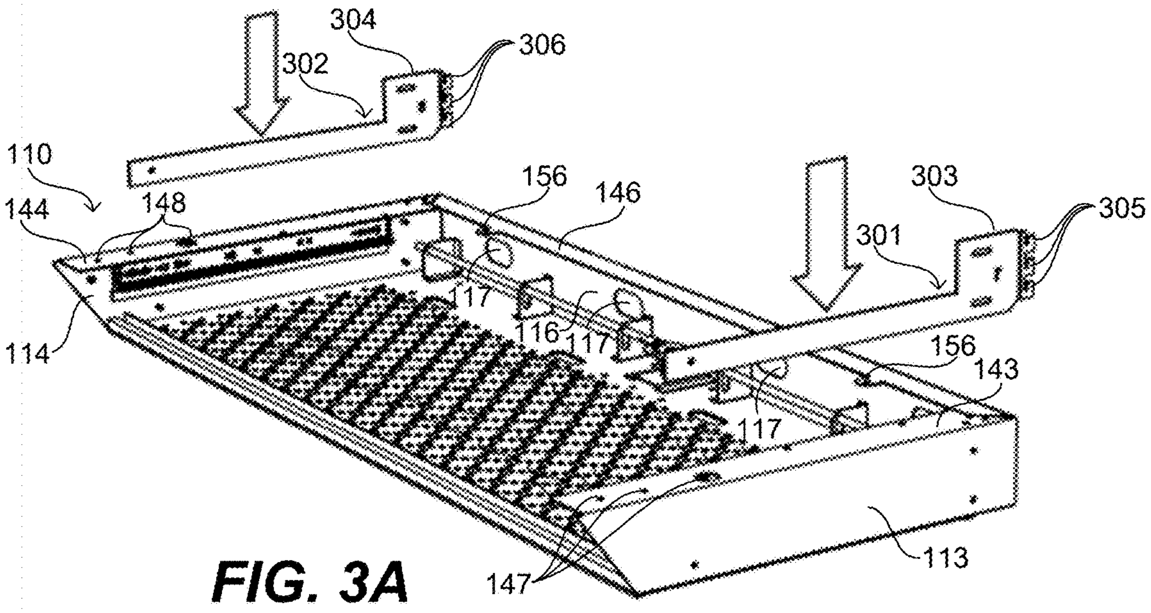
FIG. 3A illustrates the base cabinet in an upside down position and how a pair of shelf brackets can be selectively attached thereto to enable the base cabinet to be attached to a pair of vertical uprights that enable the retail display assembly to be used as a cantilever shelf.

A lock mechanism 150 is configured to selectively lock the drawer 120 in the closed position. In certain embodiments, the lock mechanism 150 is lockable and unlockable using a key that is accessible by an authorized employee of the retailer. The lock mechanism 150 can alternatively be a combination lock that can be unlocked using a combination of numbers, letters and/or symbols that is known by an authorized employee. More generally, the lock mechanism 150 can be a mechanical lock, or alternatively, an electronic lock. In accordance with certain embodiments, the drawer 120 is completely removable from the base cabinet 110 when the lock mechanism 150 is unlocked. While the lock mechanism 150 is shown as accepting a key at location towards a back portion of the top panel 111 of the base cabinet 110, the lock mechanism can be located in various alternative locations. Further, while an underside of specific type of mechanical lock mechanism is generally shown in FIG. 3A, various other types of mechanical and/or electrical lock mechanism can alternatively be used.

The top panel 111 of the base cabinet 110 includes a plurality of top panel through holes 121 configured to receive downwardly extending threaded rods 181 of one or more security brackets 180 (examples of which are shown in FIG. 1B) configured to selectively secure one or more portable electronic devices (e.g., smart phones 190 as shown in FIG. 1B) to the top panel 111 of the base cabinet 110. For example, in FIGS. 1A and 1B the through holes 121 are arranged in a repetitive pattern of crisscrossed circular through holes, as well as a repetitive pattern of crisscrossed square through holes. Other patterns or arrangements of the through holes 121 are also possible and within the scope of the embodiments described herein. The through holes 121 can be of various different diameters, widths and/or shapes to accommodate various different sized threaded bolds and/or other portions of security bracket(s) that are configured to extend below a surface (e.g., the top panel 111 of the base cabinet 110) to which a security bracket(s) is/are attached.

The front panel 135 of the drawer 120 includes a plurality of front panel through holes 139 configured to receive threaded rods and/or other attachment mechanisms of one or items that are to be attached thereto, such as, but not limited to, one or more price cards, price rails, QR codes, placards, and/or the like. In accordance with certain embodiments, the front panel 135 of the drawer 120 is at an acute angle relative to the bottom panel 132 of the drawer 120 and is at an obtuse angle relative to the top panel 132 of the base cabinet 110, as can be appreciated, e.g., from FIGS. 1A and 1B. In accordance with certain embodiments, the front panel 135 of the drawer 120 includes an upper channel 137 and a lower channel 138 between which a rectangular sheet (not shown) can be slid therein and held in place. Similarly, the top panel 111 of the base cabinet 110 can include an upper channel 127 and a lower channel 128 between which a rectangular sheet (not shown) can be slid therein and held in place. Such sheets, which can be made of plastic, paper, cardboard, or metal, can cover those of the through holes 139 in the front panel 135 of the drawer 120, and or through holes 121 in the top panel 111 of the base cabinet 110, that are not being used to secure something to the retail display assembly 100.

The top opening 131 of the drawer 120 is accessible when the drawer 120 is in the open position, such that one or more items (e.g., electronics) can be placed in the drawer 120 when the drawer 120 is in the open position. The top opening 131 of the drawer is inaccessible when the drawer 120 is locked in the closed position by the lock mechanism 150, such that item(s) placed in the drawer 120 are inaccessible when the drawer 120 is locked in the closed position by the lock mechanism 150. An underside of the top panel 111 of the base cabinet 110 is inaccessible when the drawer 120 is locked in the closed position by the lock mechanism 150, such that fasteners e.g., wingnuts or other types of rotatable lock nuts) fastened to downwardly extending threaded rods (e.g., 182 in FIG. 1B) of one or more security brackets (e.g., 180 in FIG. 1B) are inaccessible when the drawer 120 is locked in the closed position by the lock mechanism 150 hereby preventing the one or more security brackets (e.g., 180 in FIG. 1B) and the one or more portable electronic devices secured thereto from being removable from the retail display assembly 100 when the drawer 120 is locked in the closed position by the lock mechanism 150.

Figure 2A:
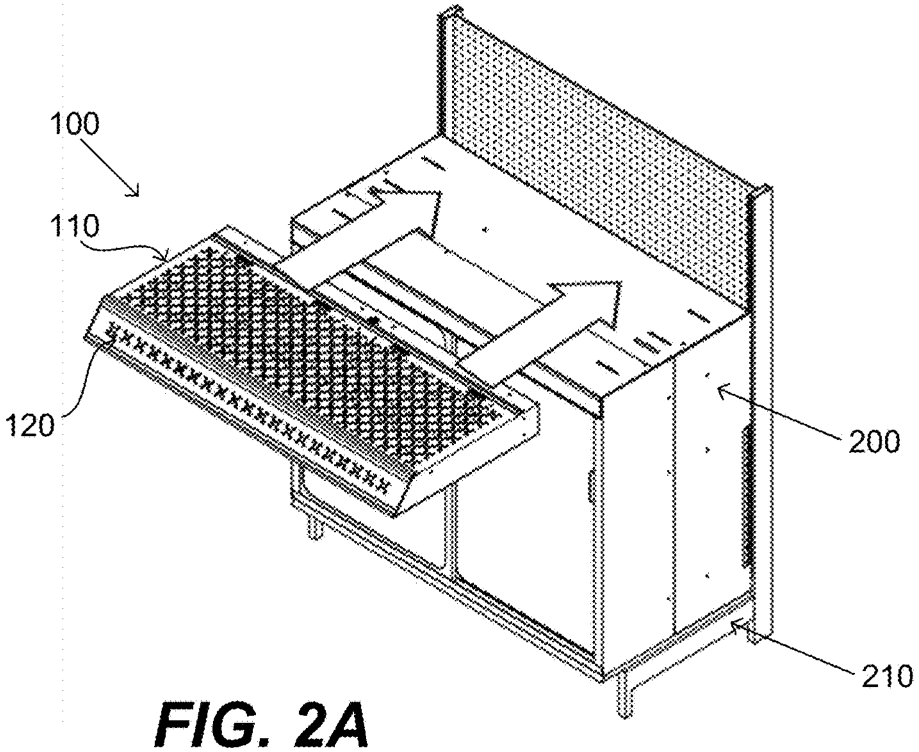
FIG. 2A illustrates how the retail display assembly can be placed on top of a lower cabinet and used as a topper of a retail display.
Figure 2B:
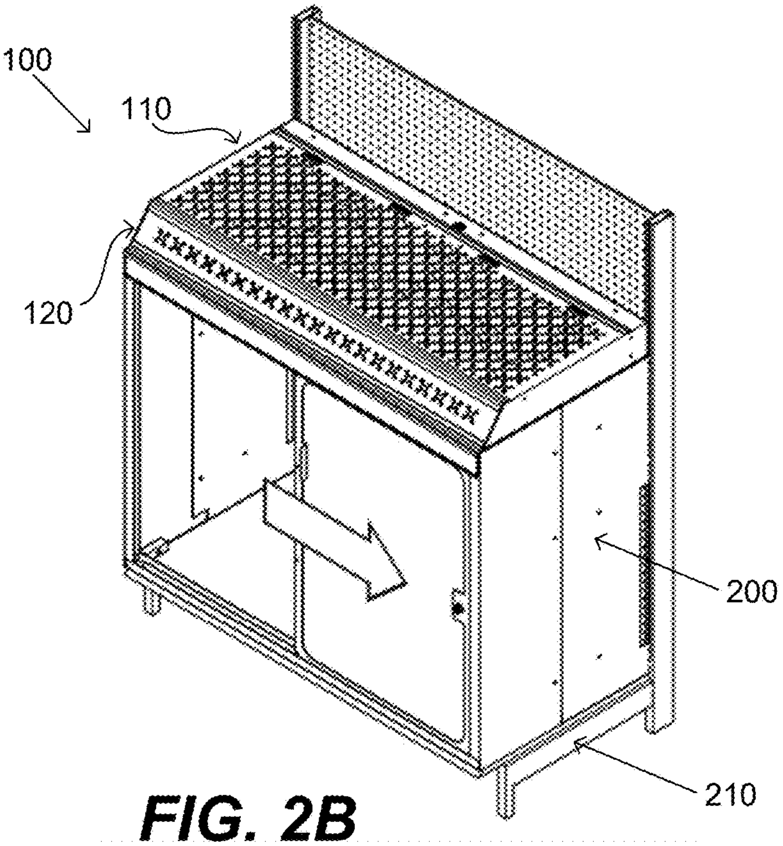
FIGS. 2B and 2C illustrates the retail display assembly resting upon and being supported by the lower cabinet introduced in FIG. 2A, and thereby being used as the topper of the retail display.
Figure 2C:
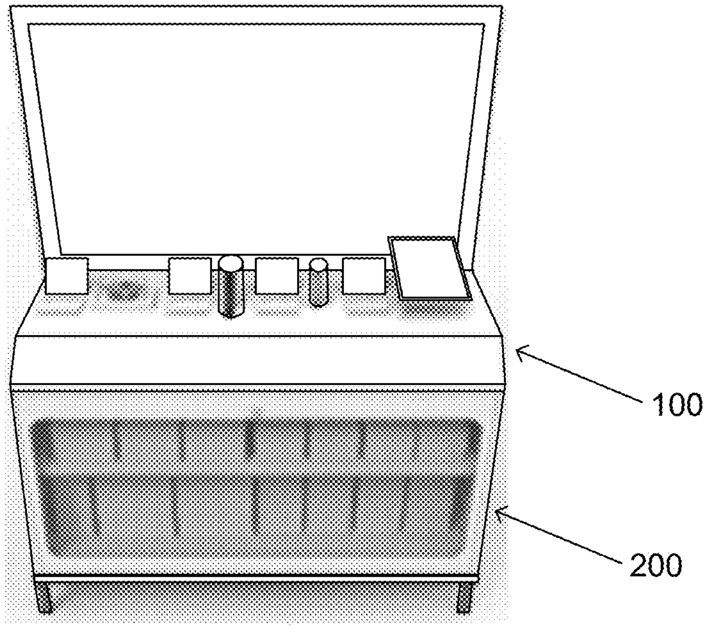

Referring briefly to FIGS. 2A, 2B, and 2C, the retail display assembly 100 can be used as a topper when the base cabinet 110, and more specifically, bottom flanges 143, 144 thereof, is/are supported by a lower cabinet 200 upon which the retail display assembly 100 rests. In FIGS. 2A, 2B, and 2C the lower cabinet 200 (that supports the base cabinet 110) is shown as resting upon a base portion of a fixture gondola 210, but alternatively, can rest directly on a floor surface. Referring briefly to FIGS. 4A and 4B, the retail display assembly 100 can alternatively be used as a cantilever shelf when the base cabinet 110 is supported by shelf brackets (301, 302 in FIGS. 3A and 3B) attached to vertical uprights 401, 402. Accordingly, if a retailer purchased multiple units of the retail display assembly 100, the retailer may use one or more of the units as topper(s) supported by one or more respective lower cabinet(s) 200 upon which the retail display assembly 100 rests, and can use one or more further ones of units as cantilever shelf(s) when the base cabinet 110 of the unit(s) is/are supported by shelf brackets attached to one or more pairs of vertical uprights 401, 402

Figure 3B:
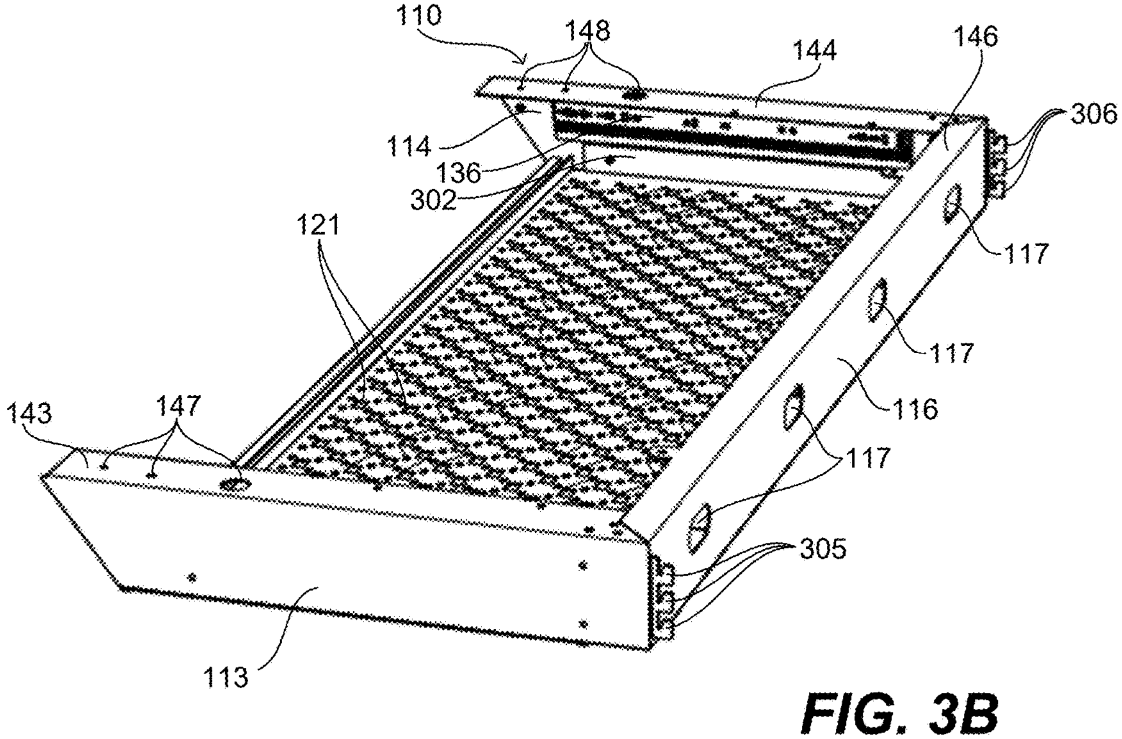
FIG. 3B illustrates the base cabinet in the upside down position after the pair of shelf brackets, introduced in FIG. 3A, have been attached thereto to enable the base cabinet to be attached to a pair of vertical uprights that enable the retail display assembly to be used as a cantilever shelf.
Figure 4A:
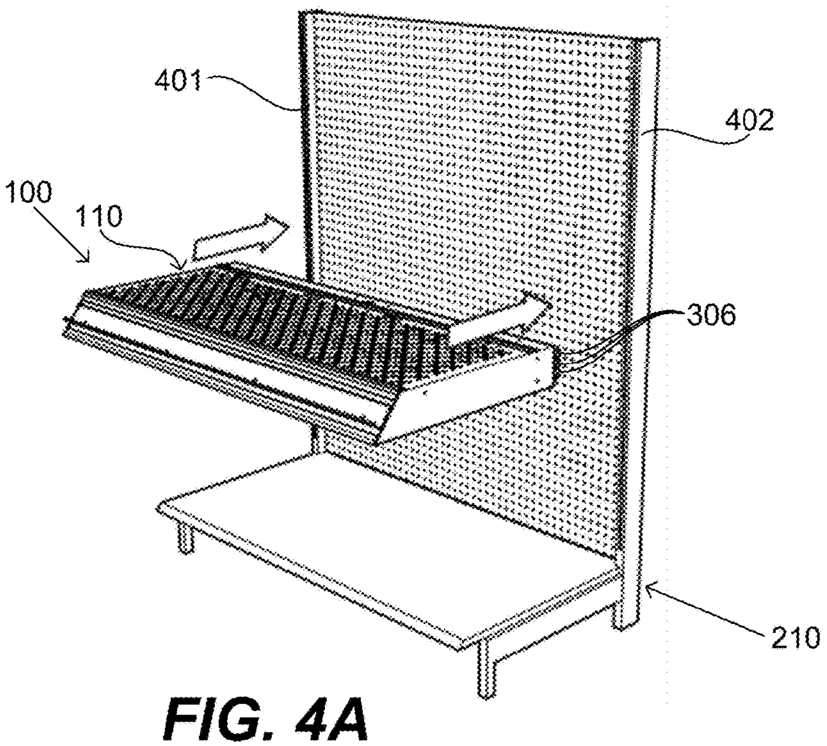
FIG. 4A illustrates how the retail display assembly can be used as a cantilever shelf when the base cabinet thereof is supported by the pair of shelf brackets attached to a pair of vertical uprights.
Figure 4B:
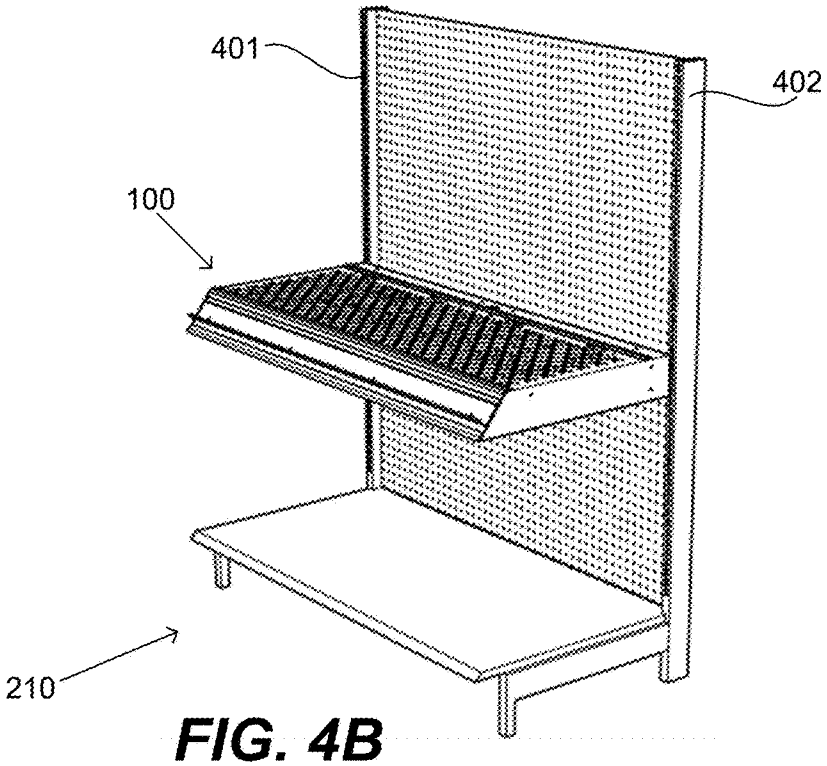
FIG. 4B illustrates the retail display assembly being used as a cantilever shelf when the base cabinet thereof is supported by the pair of shelf brackets attached to the pair of vertical uprights introduced in FIG. 4A.

Referring to FIGS. 3A and 3B, which illustrate the base cabinet 110 in upside down positions with the drawer 120 remove, the base cabinet 110 is devoid of a lower panel extending between the left and right side panels 113, 114 of the base cabinet 110. This enables an employee of a retailer to access downwardly extending threaded rods (e.g., 182 in FIG. 1B) of one or more security brackets (e.g., 180 in FIG. 1B) that are used to secure one or more portable electronic devices (e.g., 190 in FIG. 1B) to the top panel 111 of the base cabinet 110 of the retail display assembly 100, when the drawer 120 is in the open position or removed from the base cabinet 110, so that fasteners (e.g., wing nuts or other rotatable lock nuts) can be fastened to or removed from the downwardly extending threaded rods (e.g., 182 in FIG. 1B) of one or more security brackets (e.g., 180 in FIG. 1B).

As can also be seen in FIGS. 3A and 3B, the base cabinet 110 includes a left bottom flange 143 that extends inward from the left side panel 113, a right bottom flange 144 that extends inward from the right side panel 114, and a rear bottom flange that extends inward from the rear panel 116. The bottom flanges 143, 144 each include respective through holes 147, 148, which enable the base cabinet 110 to be secured to a top panel of a lower cabinet (e.g., 200 in FIGS. 2A, 2B, and 2C) using threaded bolts and fasteners (e.g., wingnuts or other types of rotatable lock nuts).

FIG. 3A illustrates a pair of shelf brackets 301, 302 that can be attached to the base cabinet 110 to enable the base cabinet 110 to be attached to a pair of vertical uprights (e.g., 402, 401 in FIGS. 4A and 4B) that enable the retail display assembly 100 to be used as a cantilever shelf. A rear portion 304 of the right shelf bracket 302 includes slot engagement features 306 that are configured to engage with spaced apart vertical slots (404 in FIG. 4A) of a right vertical upright. Similarly, a rear portion 303 of the left shelf bracket 301 includes slot engagement features 305 that are configured to engage with spaced apart vertical slots (404 in FIG. 4A) of a left vertical upright. In the embodiment shown, the right shelf bracket 302 is positioned against and attached to an inner surface of the right side panel 114, and the left shelf bracket 301 is positioned against and attached to an inner surface of the left side panel 113. The shelf brackets 301, 302 can be interchangeable in certain embodiments.

FIG. 3B illustrates the base cabinet 110 after the left and right of shelf brackets 301, 302 have been attached thereto to enable the base cabinet 110 to be attached to vertical uprights (e.g., 401, 402 in FIGS. 4A and 4B) that enable the retail display assembly 100 to be used as a cantilever shelf. As shown in FIG. 3B, after the left and right of shelf brackets 301, 302 have been attached to the base cabinet 110, the slot engagement features 305, 306 extend beyond the rear panel 116 of the base cabinet 110, as can also be seen in FIGS. 4A and 5A. In accordance with certain embodiments, the shelf brackets 301, 302 should not be attached to the base cabinet 110 when the retail display assembly 100 is being used as a topper.

As shown in FIGS. 3A and 3B, the rear panel 116 of the base cabinet 110, which extends between the left and right side panels 113, 114 of the base cabinet 110, includes one or more rear panel through holes 117, one or more of which is sized to allow an electrical plug and an electrical cable attached thereto to pass therethrough to enable electronics stored within the drawer 120 to be plugged into one or more electrical sockets located outside of the of the base cabinet 110 and the drawer 120. Various different types of electronics may be stored within the drawer 120 and may be connected by one or more wires or wirelessly (e.g., using Bluetooth) to the one or more portable electronic devices that are secured to the retail display assembly 100 by one or more security brackets. For example, electronics that enable powered products demo can be stored within the drawer 120. For a more specific example, if multiple portable electronic speakers are secured to the retail display assembly 100, then electronics that enable a costumer to select among the various portable electronic speakers and/or audio sources can be stored within the drawer 120, and buttons and/or a touch screen that enables the consumer to make their selections can be secured to the top panel 111 of the base cabinet 110 or to the front panel 135 of the drawer 120. Examples of other types of electronics that may be stored within the drawer 120 include, power strips, power supplies, media players, and electronic cabling, but are not limited thereto.

In accordance with certain embodiments, the drawer 120 is devoid of a rear panel extending between the left and right side panels 122, 134 of the drawer 120 so that when an electrical plug and an electrical cable attached thereto pass through one of the one or more rear panel through holes 117 in the rear panel 116 of the base cabinet 110, the electrical cable and the electrical plug attached thereto will not get inadvertently sandwiched between the drawer 120 and the rear panel 116 of the base cabinet 110. Further, because the drawer 120 is devoid of a rear panel extending between the left and right side panels 122, 134 of the drawer 120, when the drawer 120 is transitioned from the open position to the closed position the drawer 120 is not blocked by downwardly extending threaded rods (e.g., 182 in FIG. 1B) of one or more security brackets (e.g., 180 in FIG. 1B) that extend through at least some of the top panel through holes 121 of the top panel 111 of the base cabinet 110.

Figure 5A:
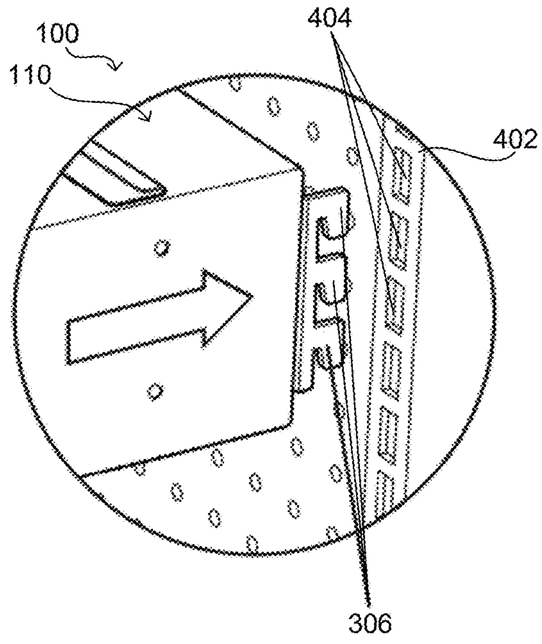
FIGS. 5A and 5B illustrate how one of the shelf brackets can be attached to one of the vertical uprights.
Figure 5B:
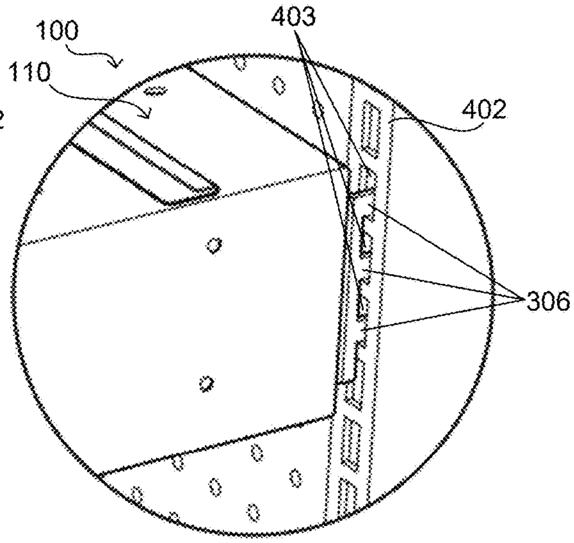

FIGS. 4A and 5A illustrate the retail display assembly 100 being moved towards the vertical uprights 401, 402 such that the slot engagement features 305, 306 of the shelf brackets 301, 302 can be aligned with and inserted into vertical slots in the vertical uprights 401, 402. FIGS. 4B and 5B illustrate the retail display assembly 100 being used as a cantilever shelf after the slot engagement features 305, 306 of the shelf brackets 301, 302 have been inserted into vertical slots 404 in the vertical uprights 401, 402.

While the vertical uprights 402, 403 are shown in FIGS. 4A and 4B as being part of or affixed to a fixture gondola 210, the vertical uprights 401, 402 can alternatively be attached directly to a wall within a retail store.

Figure 6A:
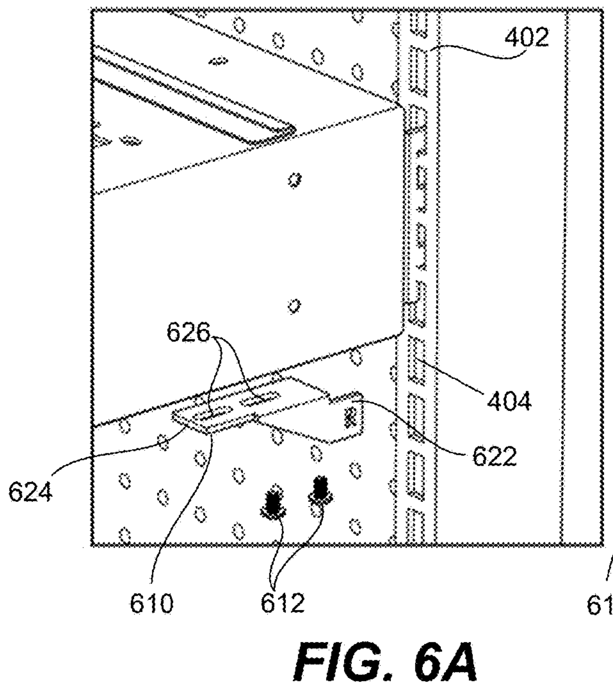
FIGS. 6A and 6B illustrates how one of the shelf brackets, after being attached to one of the vertical uprights, can be secured to the vertical upright using a locking tab and one or more screws.
Figure 6B:
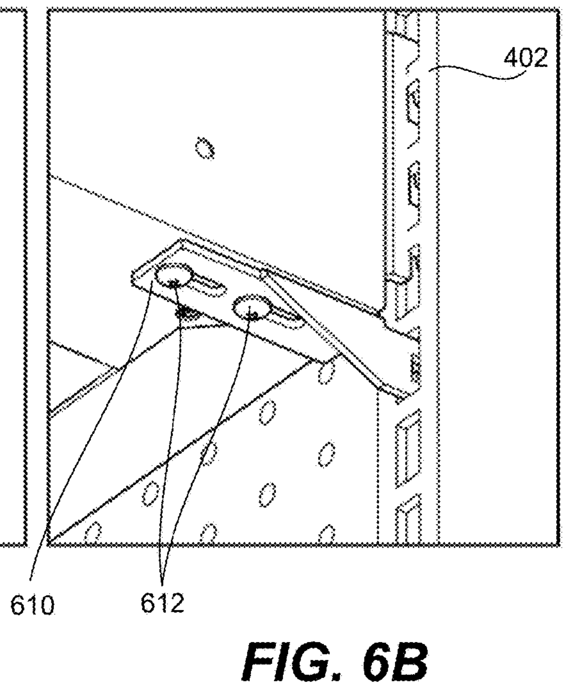

FIGS. 6A and 6B illustrates how the shelf brackets 301, 302 after being attached to the vertical uprights 402, 403 can be secured to the vertical uprights using locking tabs 610 and screws 612, to make it difficult for a potential thief to discretely attempt to remote the entire retail display assembly 100 from the vertical uprights 401, 402 and attempt to steal the retail display assembly 100 along with all of the portable electronic devices that are attached thereto and/or stored within the drawer 120 thereof. Each of the locking tabs 610 includes a first portion 622 and a second portion 624 that are generally perpendicular to one another. The first portion 622 is insertable into one of the vertical slots 404 of one of the vertical uprights 401, 402 after the slot engagement features 305, 306 of the shelf brackets 301, 302 have been inserted into other ones of the vertical slots 404. The second portion 620 has one or more through holes for the screws 612 that are used to attached the locking tab 610 to one of the flanges 143, 144 of the base cabinet 110.

In accordance with certain embodiments, the panels 111, 113, 114, and 116 of the base cabinet 110 can be made from blanks that are cut (e.g., laser cut or mechanically cut) or stamped from one or more sheets of metal, such as steel, and/or alloy, and then bent into a desired final configuration. For example, adjacent panels of the base cabinet 110 can be made from a same sheet of metal or alloy and then bent to form the various panels, or can be distinct panels that are attached to one another using welding and/or corner brackets, and/or the like. Similarly, the panels 132, 133, 134, and 135 of the drawer 120 can be made from blanks that are cut (e.g., laser cut or mechanically cut) or stamped from one or more sheets of metal and/or alloy, and then bent into a desired final configuration. Adjacent panels of the drawer 120 can be made from a same sheet of metal and alloy and then bent to form the various panels, or can be distinct panels that are attached to one another using welding and/or corner brackets, and/or the like. The shelf brackets 301, 302 can be made of made from blanks that are cut or stamped from one or more sheets of metal, such as steel, and/or alloy. The locking tabs 610 can also be made from blanks that are cut or stamped from one or more sheets of metal, such as steel, and/or alloy, and then bent so that the first and second portions 622, 624 thereof are generally perpendicular to one another. Alternatively, the locking tabs 610 can be manufactured in other manners. The base cabinet 110 and the drawer 120, or the panels thereof before or after being assembled to form the base cabinet 110 and the drawer 120, can be painted, powder coated, or otherwise covered to have any desired color and appearance.

The security brackets shown in FIGS. 1B and 2C and described herein, and referred to in the claims herein, are not part of the retail display assembly 100 described herein, but rather are capable of being using with the retail display assembly 100. Examples of security brackets including downwardly extending threaded rods 182, which can be used with the retail display assembly 100, and which rods 182 can be secured to the retail display assembly using fasteners (e.g., wing nuts or other rotatable lock nuts) after the threaded rods 182 have been passed through the through holes of the top panel 111 of the base cabinet 110 include security brackets disclosed in U.S. Pat. Nos. 10,448,759, 10,920,922, 11,432,663, 11,585,125, 12,071,790, just to name a few.

Figure 7:
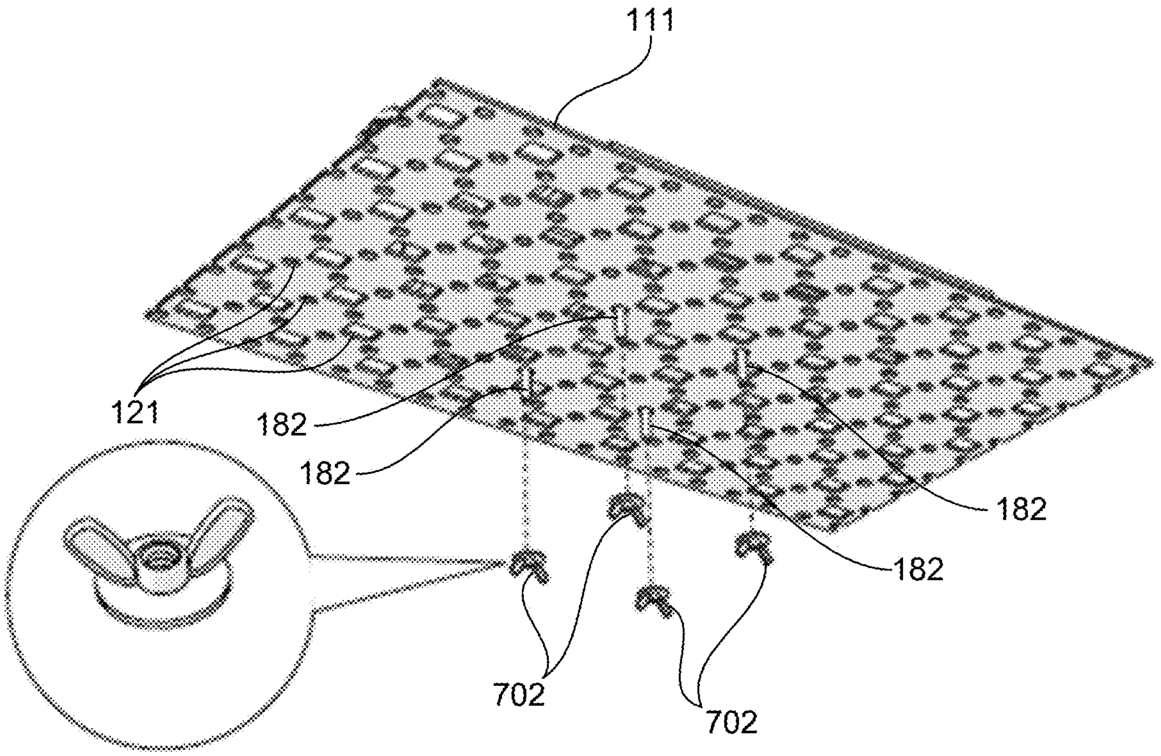
FIG. 7 illustrates a portion of an underside of a top panel of the base cabinet of the retail display assembly, and how fasteners can be fastened to, or removed from, downward extending threaded rods of a security bracket when the underside of the top panel is accessible.

FIG. 7 illustrates a portion of the underside of the top panel 111 of the base cabinet 110. FIG. 7 also shows example threaded rods 182 of an example security bracket (not shown in FIG. 7) extended through top panel through holes 121 in the top panel 111 of the base cabinet 110, and how fasteners 702 (which are wingnuts in this example) can be fastened to the downward extending threaded rods 182, or removed therefrom, when the underside of the top panel 111 is accessible.

Figure 8A:
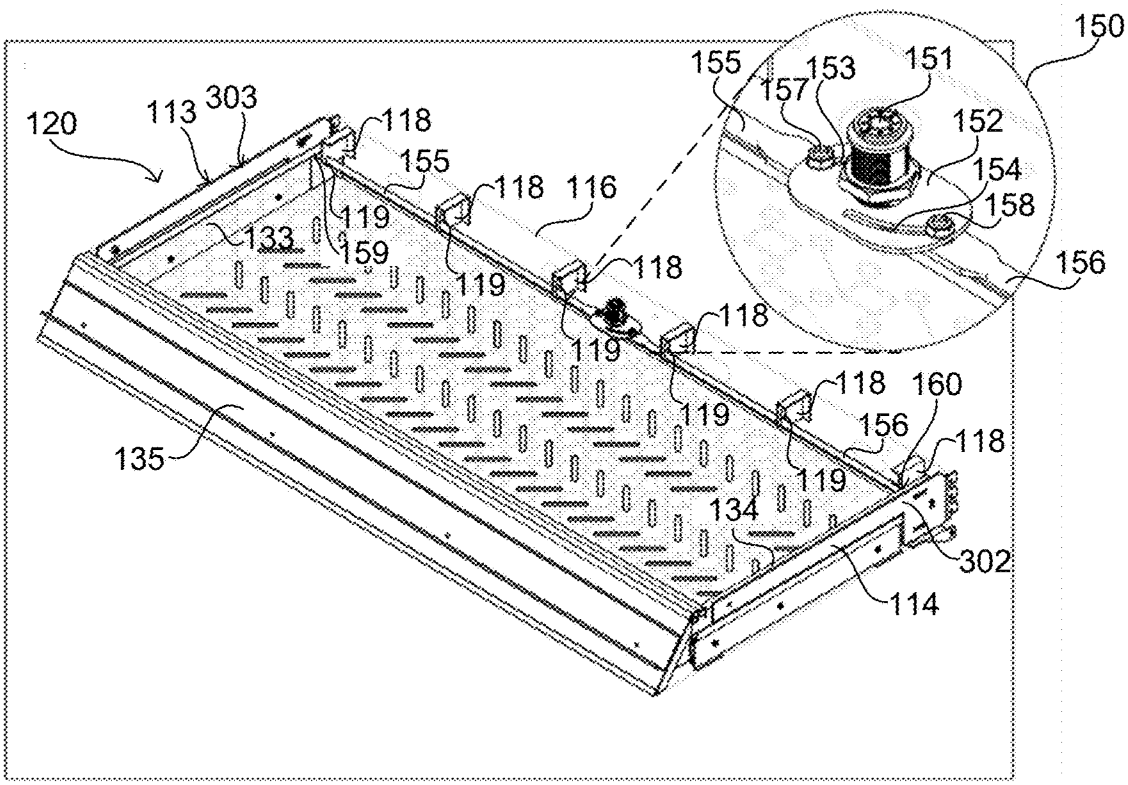
FIGS. 8A, 8B, 9A and 9B illustrate details of a lock mechanism of the retail display assembly according to an embodiment of the present technology.
Figure 8B:
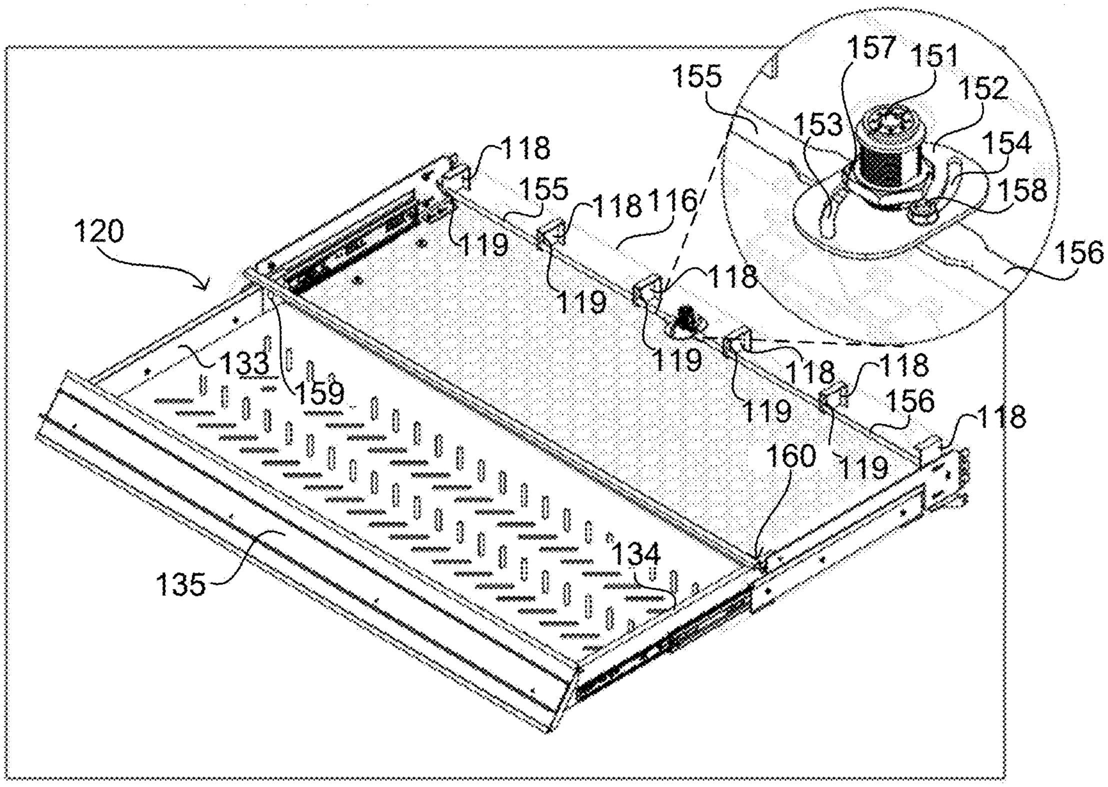
Figure 9A:
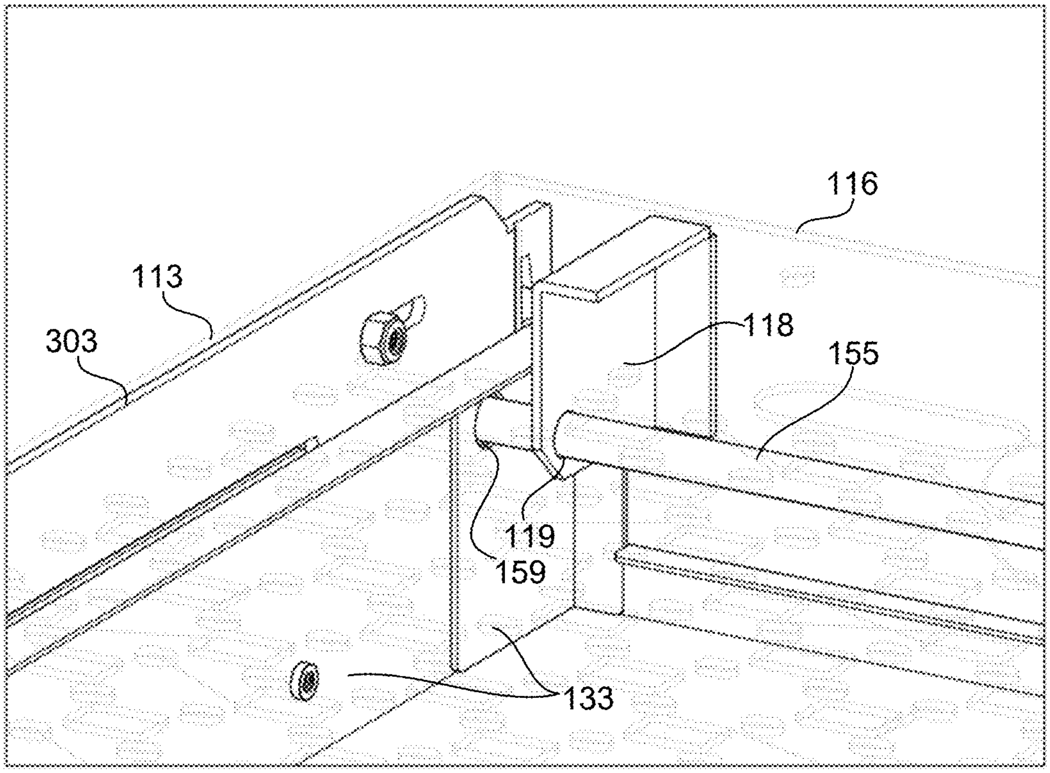
Figure 9B:
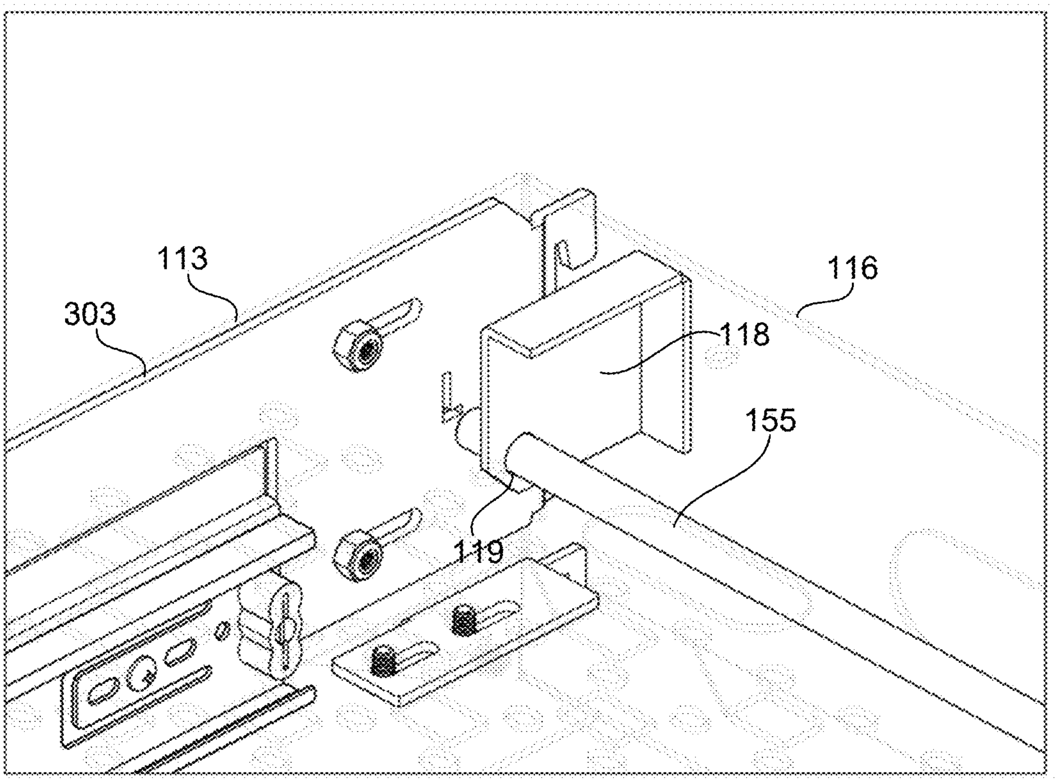

Details of the lock mechanism 150, according to an embodiment of the present technology, will now be described with references to FIGS. 8A and 8B, and FIGS. 9B and 9C. In FIGS. 8A and 9A the lock mechanism 150 is in its locked position and the drawer 120 is shown in its closed position. In FIGS. 8B and 9B the lock mechanism is in its unlocked position. In FIG. 8B the drawer 120 is shown in its open position. In FIG. 9B the drawer cannot be seen. In FIGS. 8A, 8B, 9A, and 9B the rear panel 116 of the base cabinet 110 is shown, but the top panel 111 of the base cabinet 110 is not shown so that details of the lock mechanism 150 can be seen.

The lock mechanism 150 is shown as including a rotatable lock body 151 attached to a lock plate 152 that includes a left curved through channel 153 and a right curved through channel 154. The rotatable lock body 151 can, for example, include a tubular pin tumbler lock that is configured to accept a key that is specifically configured to allow the rotatable lock body 151 to be rotated, but is not limited thereto. The lock mechanism 150 also includes a left lock rod 155 and a right lock rod 156. While an example shape of the lock rods 155, 156 is shown, the shape of the lock rods 155, 156 can differ from the shape shown. The left lock rod 155 is slidably attached at its proximal end using fastener 157 (a screw and a lock nut) to the left curved through channel 153 in the lock plate 142, and the right lock rod 156 is slidably attached at its proximal end using fastener 158 (a screw and a lock nut) to the right curved through channel 154. Referring briefly back to FIGS. 1A and 1B, when the top panel 112 of the base cabinet 110 is shown, the only portion of the lock mechanism 150 that could be seen from the top of the retail display assembly 100 is the upper portion of the rotatable lock body 151 that includes a key hole for accepting a key that can be used to selectively lock and unlock the lock mechanism 150.

As shown in FIGS. 8A and 8B, a plurality of guide plates 118 are attached to and extend perpendicularly inward from the rear panel 116 of the base cabinet 110. Each of the guide plates 118 including a respective guide through opening 119 through which one of the lock rods 155, 156 passes. More specifically, the left lock rod 155 extents through the guide through openings 119 in the three left most guide plates 118, and the right lock rod 156 extends through the guide through openings 119 in the three right most guide plate 118. More or less guide plates 118 than shown in FIGS. 8A and 8B can alternatively be included.

When the drawer 120 is in its closed position and the lock mechanism 150 is in its locked position, the lock rods 155, 156 are in their fully extended positions such that a distal end of the left lock rod 155 extends into an opening 159 in the left panel 133 of the drawer 120 (as can best be seen in FIG. 9A) and a distal end of the right lock rod 156 extends into an opening 160 in the right panel 134 of the drawer 120 (in a similar manner as shown in FIG. 9A). This prevents the drawer 120 from being opened by a person when the person pulls on the front panel 135 of the drawer 120.

The lock mechanism 150 can be transitioned from its locked position to its unlocked position by using a key (not shown) to rotate the rotatable lock body 151, e.g., about ninety degrees. This also causes the lock plate 152 and its left and right curved through channels 153, 154 to rotate about ninety degrees, which causes the left and right lock rods 155, 156 to be pulled inward (due to the shape of the curved through channels 153, 154) and transition to their retracted positions. When the lock rods 155, 156 are in their retracted positions (as shown in FIGS. 8B and 9B) the distal end of the left lock rod 155 no longer extends into the opening 159 in the left panel 133 of the drawer 120, and the distal end of the right lock rod 156 no longer extends into the opening 160 in the right panel 134 of the drawer 120. This allows the drawer 120 to be opened by a person by pulling on the front panel 135 of the drawer 120. While the lock mechanism 150 is in its open position, the drawer 120 can be opened and closed as desired by a person pulling on and pushing on the front panel 135 of the drawer 120. While the drawer 120 is in its closed position, the lock mechanism can be transitioned from its unlocked position to its lock position by using the key to rotate the rotatable lock body 151, e.g., about ninety degrees, such that the rotatable lock body 151 and the lock plate 152 return to their positions shown in FIG. 8A.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A retail display assembly that may be used to support one or more security brackets that include downwardly extending threaded rods, the retail display assembly comprising:

a base cabinet having a top panel, a left side panel, a right side panel, a right bottom flange that extends inward from the right side panel, a left bottom flange that extends inward from the left side panel, and a front opening;

a drawer having a bottom panel, a left side panel, a right side panel, a front panel, and a top opening;

the drawer configured to slide out from and into the front opening of the base cabinet to thereby transition the drawer between a closed position and an open position, and vice versa; and a lock mechanism configured to selectively lock the drawer in the closed position;

the top panel of the base cabinet including a plurality of top panel through holes configured to receive downwardly extending threaded rods of one or more security brackets that may selectively secure one or more portable electronic devices to the top panel of the base cabinet;

the top opening of the drawer being accessible when the drawer is in the open position, such that one or more items can be placed in the drawer when the drawer is in the open position; and the top opening of the drawer being inaccessible when the drawer is locked in the closed position by the lock mechanism, such that the one or more items placed in the drawer are inaccessible when the drawer is locked in the closed position by the lock mechanism;

wherein an underside of the top panel of the base cabinet is inaccessible when the drawer is locked in the closed position by the lock mechanism, such that fasteners secured to the downwardly extending threaded rods of the one or more security brackets are inaccessible when the drawer is locked in the closed position by the lock mechanism thereby preventing the one or more security brackets and the one or more portable electronic devices secured thereto from being removable from the retail display assembly when the drawer is locked in the closed position by the lock mechanism;

wherein the retail display assembly is usable as a topper and each of the right bottom flange and the left bottom flange of the base cabinet includes one or more flange through holes configured to enable threaded bolts and fasteners to secure the base cabinet to a lower cabinet upon which the retail display assembly rests when the retail display assembly is being used as a topper.

2. The retail display assembly of claim 1, wherein:

the base cabinet is devoid of a bottom panel extending between the left and right side panels of the base cabinet so that when the drawer is in the open position the underside of the top panel of the base cabinet is accessible and downwardly extending threaded rods of one or more security brackets that extend through at least some of the plurality of top panel through holes of the base cabinet are accessible from an underside of the base cabinet so that fasteners can be manually secured to or removed from the downwardly extending threaded rods.

3. The retail display assembly of claim 1, wherein in addition to be usable as a topper the retail display assembly is also usable as a cantilever shelf, the retail display assembly further comprising:

first and second shelf brackets selectively attachable to the base cabinet, adjacent to the left side and right side panels of the base cabinet, to enable the base cabinet to be attached to first and second vertical uprights to enable the retail display assembly to be used as a cantilever shelf.

4. The retail display assembly of claim 1, wherein:

the base cabinet further comprises a rear panel extending between the left and right side panels of the base cabinet; and the rear panel of the base cabinet includes one or more rear panel through holes sized to allow an electrical plug and an electrical cable attached thereto to pass therethrough to enable electronics stored within the drawer to be plugged into one or more electrical sockets located outside of the of the base cabinet and the drawer.

5. The retail display assembly of claim 4, wherein:

the drawer is devoid of a rear panel extending between the left and right side panels of the drawer, so that when the drawer is transitioned from the open position to the closed position, the drawer is not blocked by downwardly extending threaded rods of one or more security brackets that extend through at least some of the top panel through holes.

6. The retail display assembly of claim 1, wherein:
the front panel of the drawer is at an acute angle relative to the bottom panel of the drawer and is at an obtuse angle relative to the top panel of the base cabinet.

7. The retail display assembly of claim 1, wherein:
the front panel of the drawer includes an upper channel and a lower channel between which a rectangular sheet can be slid therein and held in place.

8. The retail display assembly of claim 1, wherein:
the front panel of the drawer includes a plurality of front panel through holes that enables a price rail holder and/or a placard to be attached using one or more threaded bolts and respective fasteners.

9. The retail display assembly of claim 1, wherein:
the base cabinet further comprises a rear panel, extending between the left and right side panels of the base cabinet, and a plurality of guide plates each of which extends inward from the rear panel and includes a respective guide through opening;
the lock mechanism comprises:
a rotatable lock body;
a lock plate attached to the rotatable lock body and including left and right curved through channels;
a left lock rod slidably attached at a proximal end thereof to the left curved through channel in the lock plate and extending through the guide through openings in a first subset of the guide plates; and
a right lock rod slidably attached at a proximal end thereof to the right curved through channel in the lock plate and extending through the guide through openings in a second subset of the guide plates;
when the drawer is in the closed position and the lock mechanism is in a locked position the left and the right lock rods are in their extended positions such that distal ends thereof extend into respective through openings in the left and right side panels of the drawer, thereby preventing the drawer from being opened; and
when the lock mechanism is transitioned from the locked position to an unlocked position, in response to a key being used to rotate the rotatable lock body and the lock plate attached thereto, the left and right lock rods transition to their retracted positions such that the distal ends thereof no longer extend into the respective through openings in the left and right side panels of the drawer, thereby allowing the drawer to be opened.

10. A retail display assembly that may be used to support one or more security brackets that include downwardly extending threaded rods, the retail display assembly comprising:
a base cabinet including a top panel, a left side panel, a right side panel, a rear panel, and a front opening; and
a drawer including a front panel, a left side panel, a right side panel, and a top opening and configured to slide out from and into the front opening of the base cabinet to thereby transition the drawer between a closed position and an open position and vice versa;
the top panel of the base cabinet including a plurality of top panel through holes configured to receive downwardly extending threaded rods of one or more security brackets that may selectively secure one or more portable electronic devices to the top panel of the base cabinet;
the top opening of the drawer and an underside of the top panel of the base cabinet being accessible when the drawer is in the open position; and
the top opening of the drawer and the underside of the top panel of the base cabinet being inaccessible when the drawer is in the closed position;
wherein the retail display assembly is usable as a topper when the base cabinet is supported by a lower cabinet upon which the retail display assembly rests, and as a cantilever shelf when the base cabinet is supported by shelf brackets attached to vertical uprights;
wherein the base cabinet is devoid of a bottom panel so that when the drawer is in the open position an underside of the top panel of the base cabinet is accessible and downwardly extending threaded rods of one or more security brackets that extend through at least some of the plurality of top panel through holes of the base cabinet are accessible from an underside of the base cabinet so that fasteners can be manually attached to or removed from the downwardly extending threaded rods; and
wherein the base cabinet includes one or more rear panel through holes in the rear panel to allow an electrical plug and an electrical cable attached thereto to pass therethrough to enable electronics stored within the drawer to be plugged into one or more electrical sockets located outside of the of the base cabinet and the drawer.

11. The retail display assembly of claim 10, wherein:
the drawer is devoid of a rear panel so that when an electrical plug and an electrical cable attached thereto pass through one of the one or more rear panel through holes in the rear panel of the base cabinet, the electrical cable and the electrical plug attached thereto will not get inadvertently sandwiched between the drawer and the rear panel of the base cabinet.

12. The retail display assembly of claim 11, wherein the drawer includes a bottom panel that prevents access to an underside of the top panel of the base cabinet when the drawer is in the closed position, and makes inaccessible downwardly extending threaded rods of one or more security brackets and fasteners secured to the rods that secure one or more portable electronic devices to the top panel of the base cabinet.

13. The retail display assembly of claim 10, wherein:
the drawer is devoid of a rear panel so that when the drawer is transitioned from the open position to the closed position the drawer is not blocked by downwardly extending threaded rods of one or more security brackets that extend through at least some of the top panel through holes.

14. The retail display assembly of claim 13, wherein the base cabinet includes:
a right bottom flange that extends inward from the right side panel of the base cabinet; and
a left bottom flange that extends inward from the left side panel of the base cabinet;
each of the right bottom flange and the left bottom flange includes one or more flange through holes configured to enable threaded bolts and fasteners to secure the base cabinet to the lower cabinet upon which the retail display assembly rests when the retail display assembly is being used as a topper.

15. The retail display assembly of claim 10, further comprising:
first and second shelf brackets selectively attachable to the base cabinet, adjacent to the left side and right side panels of the base cabinet, to enable the base cabinet to be attached to vertical uprights to enable the retail display assembly to be used as a cantilever shelf.

16. The retail display assembly of claim 10, further comprising a lock mechanism that is configured to selectively lock the drawer in the closed position.

17. A retail display assembly that may be used to support one or more security brackets that include downwardly extending threaded rods, comprising:

a base cabinet including a top panel, a left side panel, a right side panel, a rear panel, and a front opening; and a drawer including a front panel, a left side panel, a right side panel, and a top opening and configured to slide out from and into the front opening of the base cabinet to thereby transition the drawer between a closed position and an open position and vice versa;

the top panel of the base cabinet including a plurality of top panel through holes configured to receive downwardly extending threaded rods of one or more security brackets that may selectively secure one or more portable electronic devices to the top panel of the base cabinet;

the top opening of the drawer and an underside of the top panel of the base cabinet being accessible when the drawer is in the open position;

the top opening of the drawer and the underside of the top panel of the base cabinet being inaccessible when the drawer is in the closed position; and a lock mechanism that is configured to selectively lock the drawer in the closed position, wherein the lock mechanism comprises:

a rotatable portion;

left and right lock rods slidably attached at proximal ends thereof to the rotatable portion; and when the drawer is in the closed position and the lock mechanism is in a locked position the left and the right lock rods are in their extended positions such that distal ends thereof extend into respective through openings in the left and the right side panels of the drawer, thereby preventing the drawer from being opened; and when the lock mechanism is transitioned from the locked position to an unlocked position, in response to a key being used to rotate the rotatable portion, the left and the right lock rods transition to their retracted positions such that the distal ends thereof no longer extend into the respective through openings in the left and the right side panels of the drawer, thereby allowing the drawer to be opened.

18. The retail display assembly of claim 17, wherein the base cabinet is devoid of a bottom panel so that when the drawer is in the open position an underside of the top panel of the base cabinet is accessible and downwardly extending threaded rods of one or more security brackets that extend through at least some of the plurality of top panel through holes of the base cabinet are accessible from an underside of the base cabinet so that fasteners can be manually attached to or removed from the downwardly extending threaded rods.

19. The retail display assembly of claim 17, wherein the base cabinet includes one or more rear panel through holes in the rear panel to allow an electrical plug and an electrical cable attached thereto to pass therethrough to enable electronics stored within the drawer to be plugged into one or more electrical sockets located outside of the of the base cabinet and the drawer.

20. The retail display assembly of claim 17, wherein the retail display assembly is usable as a topper when the base cabinet is supported by a lower cabinet upon which the retail display assembly rests, and as a cantilever shelf when the base cabinet is supported by shelf brackets attached to vertical uprights.

21. The retail display assembly of claim 20, wherein the base cabinet includes:

a right bottom flange that extends inward from the right side panel of the base cabinet; and a left bottom flange that extends inward from the left side panel of the base cabinet;

each of the right bottom flange and the left bottom flange includes one or more flange through holes configured to enable threaded bolts and fasteners to secure the base cabinet to the lower cabinet upon which the retail display assembly rests when the retail display assembly is being used as a topper.

22. The retail display assembly of claim 21, further comprising:

first and second shelf brackets selectively attachable to the base cabinet, adjacent to the left side and right side panels of the base cabinet, to enable the base cabinet to be attached to vertical uprights to enable the retail display assembly to be used as a cantilever shelf.

23. The retail display assembly of claim 10, further comprising:

a right bottom flange that extends inward from the right side panel of the base cabinet and a left bottom flange that extends inward from the left side panel of the base cabinet, each of the right bottom flange and the left bottom flange including one or more flange through holes configured to enable threaded bolts and fasteners to secure the base cabinet to the lower cabinet upon which the retail display assembly rests when the retail display assembly is being used as a topper; and first and second shelf brackets selectively attachable to the base cabinet, adjacent to the left side and right side panels of the base cabinet, to enable the base cabinet to be attached to vertical uprights to enable the retail display assembly to be used as a cantilever shelf.

* * * * *